Patented Feb. 13, 1923.

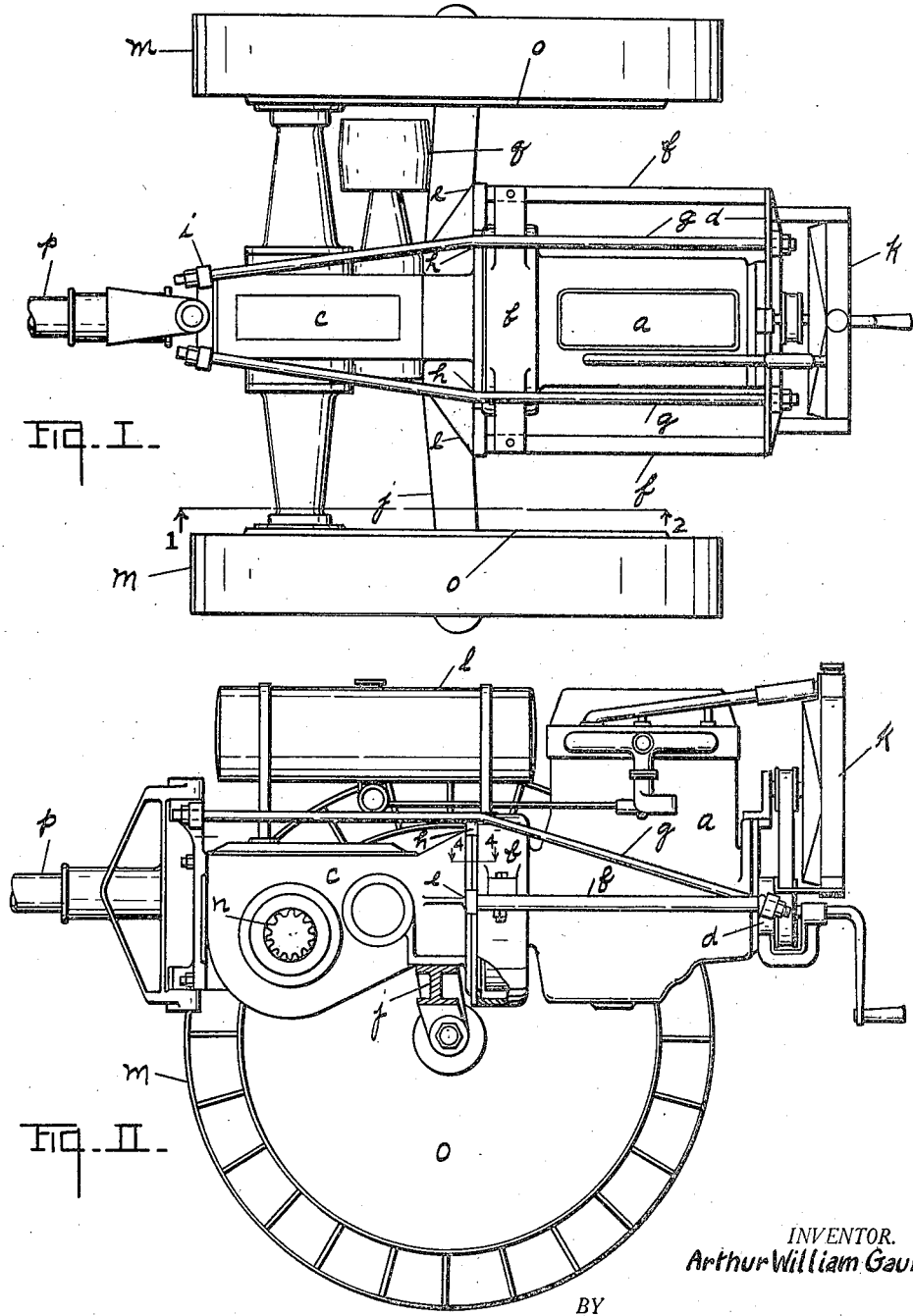

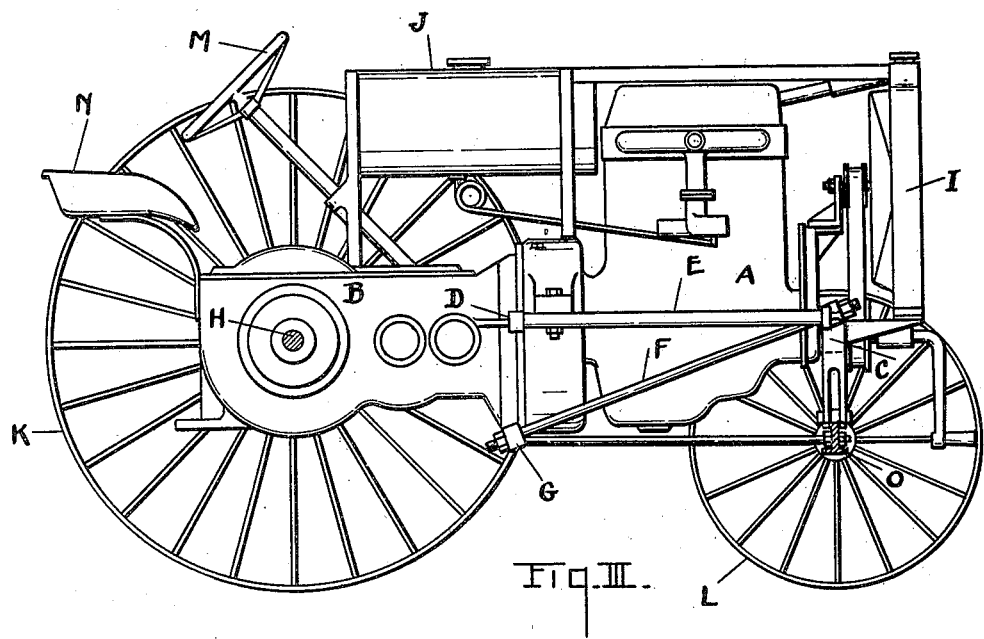
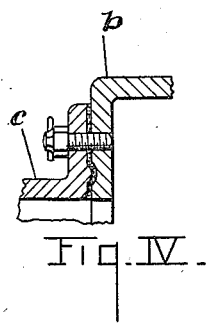

1,444,967

UNITED STATES PATENT OFFICE.

ARTHUR WILLIAM GAUBATZ, OF MADISON, WISCONSIN, ASSIGNOR, BY MESNE ASSIGNMENTS, TO ELLWOOD TRACTOR COMPANY, OF PARIS, ILLINOIS.

TRACTOR FRAME.

Application filed December 15, 1920. Serial No. 431,032.

*To all whom it may concern:*

Be it known that I, ARTHUR WILLIAM GAUBATZ, a citizen of the United States, residing at Madison, in the county of Dane and State of Wisconsin, have invented a new and useful Tractor Frame, of which the following is a specification.

My invention relates to improvements in tractors in which an engine having an annular housing enclosing the flywheel is bolted by means of this flywheel housing to the transmission gear case of the tractor; and the objects of my invention are, first, to provide a light, simple, and cheap means for holding the engine rigidly in alignment with the transmission gear casing of the tractor and second, to provide means for easily and permanently adjusting the alignment of the engine with respect to the transmission gear case.

I attain these objects by the mechanism illustrated in the accompanying drawings, in which—

Figure 1 is a plan view and Figure 2 is a section on line 1, 2 of a tractor of the type in which the engine and transmission and their fittings are suspended between two traction wheels; Fig. 3 is a sectional view of a tractor in which the transmission and motor are mounted on four wheels, the rear two of which are the traction wheels. Fig. 4 is a detail section taken on a line corresponding to line 4—4 of Fig. 2, showing details of the joint between the flywheel housing and the transmission.

Similar letters refer to similar parts throughout the several views.

Referring to Figures 1 and 2, $a$ is an engine having an annular flywheel housing $b$. This housing has a finished circular groove cut into its end into which a finished circular ring on the end of the transmission case $c$ accurately fits. The transmission case is also securely bolted to the flywheel housing. To the forward end of the engine is fastened a transverse member $d$. On both sides of the engine and between pads on the transverse member $d$ and pads $e$ on the transmission case $c$ are stiff members $f$. Slanting upward and backward are rods $g$ which pass through the transverse member $d$, are supported by arms $h$ on the transmission case and pass through bracket $i$. The motor, transmission, and the various other parts are supported by an axle $j$ under a pad on the transmission case $c$.

The rear end of the engine is supported and held accurately in position by the annular ring on the transmission case fitting into the circular groove in the housing $b$. In the arrangement for supporting the front end of the engine, the members $f$ are under compression due to the backward pull of the rods $g$. Rods $g$ are tightened and adjusted by the nuts on their ends to hold the engine in proper alignment with the transmission case.

A radiator, $k$, is supported by cross member $d$ and contains the cooling water which is circulated through the engine. The fuel tank is designated $l$. Traction wheels $m$ are driven by pinions $n$ meshing with gears within dust excluding shields $o$.

The implement drawn by the tractor is fastened to an extension of tube $p$. Steering is accomplished by swinging the tube $p$ from side to side with respect to the front wheels by means of a suitable mechanism. A belt may be driven by belt pulley $q$.

Referring to Figure 3, A is an engine having a flywheel housing with a circular groove similar to that shown in Figure 2, and B is a transmission gear casing having a flange with a circular ring fitting accurately into the groove of the flywheel housing and said flange bolted to the flywheel housing in a manner similar to that shown in Figure 2. To the forward end of the engine is fastened a transverse member C. On both sides of the engine and between pads on said transverse member and pads D on the transmission case are stiff compression members E. Slanting downward and backward from bosses on said transverse member, rods F on both sides of the engine pass through bosses G fastened to the transmission case. Nuts on both ends of the rods allow the rod to be tightened. The rear end of the tractor is supported by axle H while the front end is supported by axle O which is fastened to the transverse member C.

The rear end of the motor is accurately held in its correct relation to the transmission case by the annular ring on the transmission case fitting into the groove in the flywheel case. The front end of the engine is held in alignment with the transmission case by the truss effect of the combination of members E, F, and B. The alignment of the engine may easily and permanently be adjusted by adjusting the nuts on the tension member F.

I is a radiator carrying the cooling water which circulates through the engine and J is the fuel tank. K is a traction wheel of which there is a similar one on the side cut away. L is a front steering wheel of which there are two. M is a steering hand wheel which controls the front wheels through suitable gearing. N is the operator's seat.

I am aware that prior to my invention, agricultural tractors have been made using engines having an annular flywheel housing with a circular groove into which a circular ring on the transmission accurately fits and with said flywheel housing bolted to said transmission case so securely that no other means for holding the front end of the engine in alignment with the transmission case were necessary; but

I claim:

1. In a structure of the class described, the combination with an axle, of a transmission casing mounted on said axle, an engine body comprising a flywheel housing abutting the end of said transmission casing, cross members engaging the front end of said engine body, and the rear end of said transmission casing, thrust members on said transmission casing, compression bars disposed between said thrust members and the front cross member, and tension rods provided with adjusting means extending between said front and rear cross members, said transmission casing being provided with supports for said tension rods whereby the front portions of said tension members are supported at an angle to said compression members.

2. In a structure of the class described, the combination of a transmission casing, an engine body abutting the end of said transmission casing, a cross member at the outer end of said engine body, thrust members on said transmission casing, compression bars disposed between said thrust members and the front cross member, a cross member at the outer end of said transmission casing, and tension rods extending between said cross members and provided with adjusting means, said tension rods being disposed at an angle to said compression members.

3. In a structure of the class described, the combination of a transmission casing, an engine body abutting the end of said transmission casing, a cross member at the outer end of said engine body, thrust members on the end of said transmission casing, compression bars disposed between said thrust members and cross member, and tension rods extending between said cross member and connected to said transmission casing, said tension rods being disposed at an angle to said compression members.

ARTHUR WILLIAM GAUBATZ.

Witnesses:
E. W. ANDERSON,
HAROLD M. MERRY.